2 Sheets—Sheet 1.

H. DUEBERG.

Brick Press.

No. 2,985. Reissued June 10, 1868.

Witnesses
Gustav Berg
Hermann Geo.

Inventor:
per H Dueberg
Van Santvoord & Hauff
Attorneys

THE NORRIS PETERS CO., PHOTO-LITHO., WASHINGTON, D. C.

2 Sheets—Sheet 2.

H. DUEBERG.

Brick Press.

No. 2,985. Reissued June 10, 1868.

Witnesses
Gustav Berg
Hermann Gross

Inventor:
H Dueberg
Per
Van Santvoord & Hauff.
Attorneys.

THE NORRIS PETERS CO., PHOTO-LITHO., WASHINGTON, D. C.

United States Patent Office.

HELMUTH DUEBERG, OF NEW YORK, N. Y.

*Letters Patent No.* 71,466, *dated November* 26, 1867; *reissue No.* 2,985, *dated June* 16, 1868.

IMPROVED BRICK-MACHINE.

The Schedule referred to in these Letters Patent and making part of the same.

TO ALL WHOM IT MAY CONCERN:

Be it known that I, HELMUTH DUEBERG, of the city, county, and State of New York, have invented a new and improved Brick-Press; and I do hereby declare the following to be a full, clear, and exact description thereof, enabling those skilled in the art to make and use the same, reference being had to the accompanying drawing, forming part of this specification, in which drawing—

Similar letters indicate corresponding parts.

Figure 1:
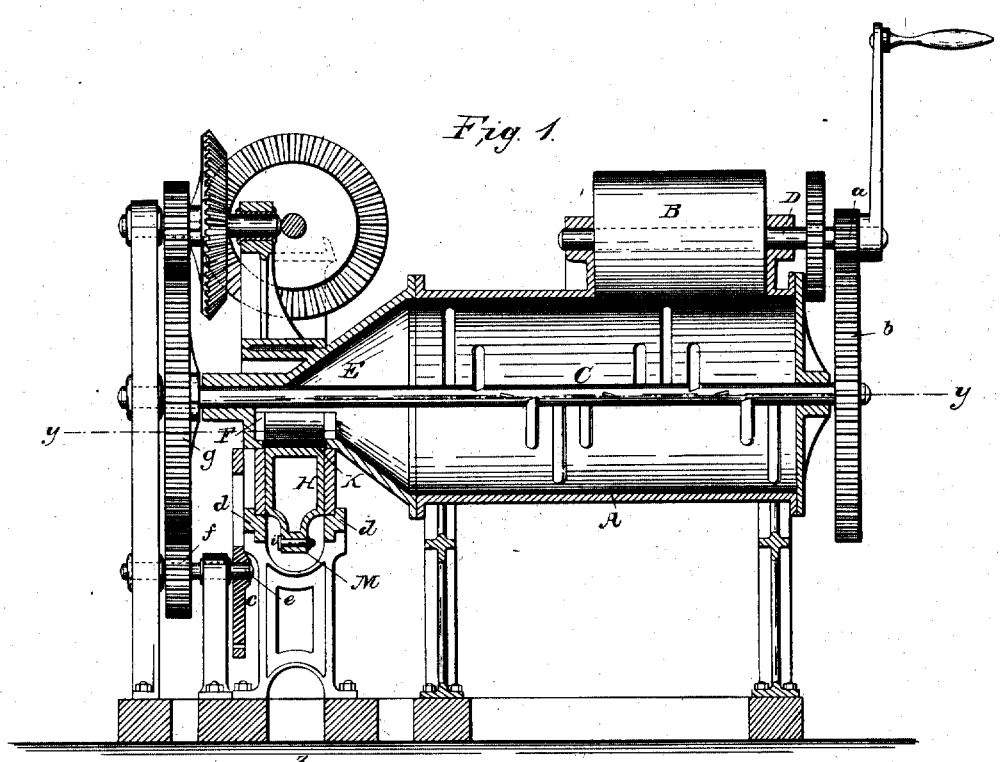
Figure 1 represents a longitudinal vertical section of this invention, taken in the plane by the line *x x*, fig. 2.
Figure 2:
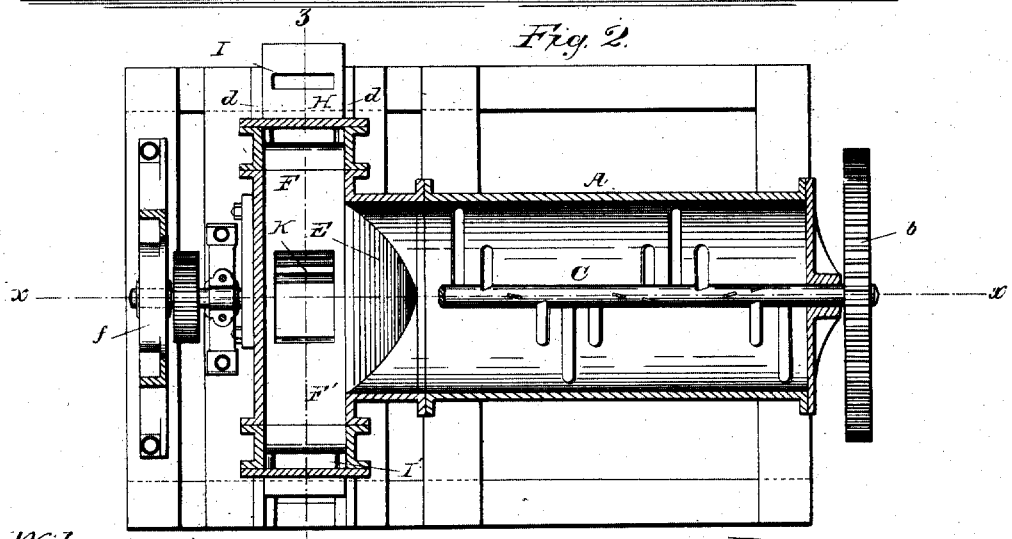
Figure 2 is a horizontal section of the same, the plane of section being indicated by the line *y y* in fig. 1.

This invention consists in combining in one machine the two principal operations, either of which has heretofore been used independent of the other in forming bricks by machinery, thus subjecting the clay to two subsequent operations, and producing bricks of superior quality.

These two operations are—

First, forcing the clay through a forming-die, and cutting the bar of clay issuing from the forming-die into pieces of the proper dimensions.

Second, pressing the clay into moulds which have the dimensions of the bricks.

By my machine the clay is forced through a channel or forming-die, whereby a bar is produced from which the roughly-shaped bricks are cut off and then pressed over in suitable moulds. The clay passes from a pug-mill, or any other tempering-apparatus, into a spout, where it accumulates before a feeder, which forces it into the channels or forming-dies, the latter being arranged singly or in pairs. The bar of clay, issuing from the forming-die, passes into a press-box, where pieces are cut off from it, each piece thus cut off forming a roughly-shaped brick. A movable table, containing two or more moulds, carries these bricks alternately under the press-boxes, so that the rough brick, previously cut off from the bar of clay, can be pressed over in the mould under the press-box by a plunger.

The rough bricks are of such dimensions that they contain a little more clay than required for a finished brick. This surplus clay is allowed to escape while the brick is being pressed over in the mould, for which purpose the press-boxes are provided with suitable recesses.

The bricks may be pressed either from their flat sides, as usual, or from their edges.

The bricks are discharged from the moulds by the action of the followers, which form the bottoms of the moulds, and which are movable, those of two moulds being connected with each other by a rocking-lever, or equivalent mechanism, in such a manner that while one of the followers is depressed the other rises, and *vice versa*. By this arrangement one mould discharges the pressed brick, while the other receives a rough one.

Self-acting lubricators, which act on the followers of the moulds facilitate the taking off of the finished bricks from the table.

A represents a pug-mill, of any desired construction, to which the clay is fed through a hopper, (not shown in the drawing,) said clay being made to pass through between two rollers, B, which serve to break up stones and other impurities that may be mixed with the clay. After the clay reaches the cylinder of the pug-mill, it is forced along the oblique blades or spiral flanges, which are secured to the shaft C, that passes in a longitudinal direction through the cylinder of the pug-mill, and to which a revolving motion is imparted from the driving-shaft D, with which it connects by gear-wheels *a b*.

The cylinder of the pug-mill is provided with a spout, E, which terminates in two channels, F F′, which serve as forming-dies for the clay passing through them. The clay, by the action of the forming-dies, being formed into a bar, is delivered to the press-boxes G G′.

Under the press-boxes is situated the table H, which moves in guides *d d′*, a reciprocating motion being imparted to it by a cam, *c*, which is mounted on a shaft, *e*, connecting, by cog-wheels *f g*, with the main shaft C.

From the centre of the table rises the feeder K, and as the table moves from one side to the other, the feeder forces the clay accumulated before it through the forming-dies, so that the end of the bar of clay enters the press-boxes.

In the ends of the table are the moulds I I′, which are arranged in pairs, one or more being at each end of the table; and the cam *c*, which acts on a cage secured to the table, is so shaped that it carries the moulds I I′, alternately, under the press-boxes G G′, leaving the table at rest, for a short period, at each end of its stroke, to give time for pressing.

The operation of cutting the bricks off from the bar, and pressing them over, is effected by plungers J J′, which are fitted into the press-boxes G G′, and to which a rising and falling motion is imparted, by eccentrics or other suitable means. As the plungers in the press-boxes descend, they cut off rough-shaped bricks from the bars of clay, and press them into the moulds.

The dimensions of the bar of clay are such that each of the roughly-shaped bricks cut off therefrom contains a little more clay than required for a finished brick. In order to permit this surplus clay to escape while the brick is being pressed in the mould, the press-boxes are provided with recesses, *h h*, either on all or on part of their inner sides. After the brick in the mould has been compressed to a certain point, the reaction of the clay causes the surplus to escape from underneath the plunger into said recesses.

By this method of pressing bricks, they will be all alike in their dimensions, as well as in pressure or density.

According to the shape of the forming-dies, plungers, and moulds, the bricks may be pressed either from their flat sides or from their edges.

As the plungers in the press-boxes descend, the rough bricks are forced from the press-boxes into the moulds, which are provided with movable bottoms or followers, L L′.

These followers are secured to the ends of a lever, M, which has its fulcrum on a pivot, *i*, secured to the bottom of the table. When the plunger J descends, and forces the brick into the mould I, the follower L of this mould descends, and consequently the follower L′, in the mould I′, rises, and the pressed brick contained in this mould is pushed out, so that it can be conveniently removed from the table.

Instead of connecting the followers by a lever, M, as shown in the drawing, they might be connected by toothed segments and racks, or by any other suitable mechanism.

The plungers J J′ descend a little below the bottom of the press-boxes G G′, entering the moulds I I′ to a little extent, say one-eighth of an inch. Thereby the brick receives a very high pressure, as no clay can escape during the last period of pressing, that is, while the plunger descends into the mould itself. Also, the upper corners of the brick, by the said arrangement, are rendered perfectly sharp, and the upper surface of the brick is prevented from being rubbed against the bottom of the press-box while the table moves.

The followers L L′ are prevented from descending beyond the desired point by projections *k k*, in the moulds, and they rise level to or a little above the surface of the table.

To prevent the bricks from adhering to the followers, said followers are oiled after every action of the plungers, the oil being introduced automatically from cups *m*, from which it passes down, through suitable channels, to pieces *n*, of flannel or other absorbent material; and as the table reciprocates under these pieces of flannel, the followers are oiled.

Figure 3:
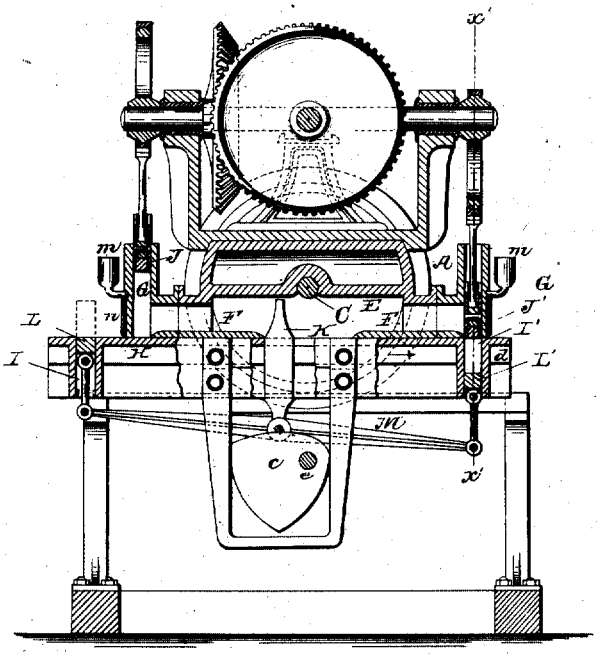
Figure 3 is a transverse section of the same, the line *z z*, fig. 2, indicating the plane of section.
Figure 4:
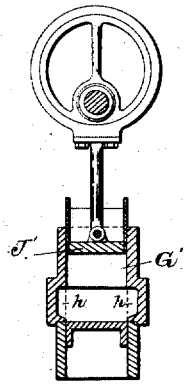
Figure 4 is a transverse section of one of the cylinders, the line *x′ x′*, fig. 3, indicating the plane of section.

The operation is as follows:

By the action of the pug-mill, the tempered clay is continually forced into the spout E, where it accumulates on both sides of the feeder K, and remains for a short time at rest. As the table moves in the direction of the arrow marked thereon in fig. 3, while, at the same time, the plunger J descends, the clay, accumulated before the feeder K, is pushed along in the direction of said arrow, and a portion of the same being formed in a bar, is forced out through the forming-die F′ into the press-box G′.

When said plunger has travelled through one-half of its stroke, the table, with the feeder, remains stationary, and the clay bar, issuing from the forming-die, is not forced any further into the press-box. During this time, and while the table remains stationary, the empty space behind the feeder is charged with clay, and as the table recedes, another clay bar is forced out through the forming-die F into the press-box G. At the same time the plunger J′ descends and cuts off the end of the bar of clay in the press-box G, thereby forming a rough brick, which contains a little more clay than required for a finished brick.

In the mean time, the mould I′ is carried under the press-box G, and as the plunger J′ continues to descend, the rough brick, just cut off from the clay bar, is forced into said mould, and pressed over in it, the surplus clay, together with the atmospheric air, escaping into the recesses *h h*, whereby the brick is finished.

While the brick is forced into the mould, the follower L′ descends, to make room for the brick, and the follower L rises.

When the table again returns in the direction of the arrow marked on it, the plunger J descends, and the mould I arrives under the press-box G, the follower L is depressed by another brick being forced into the mould I, and the follower L′ rises, thereby pushing out the brick previously pressed in the mould I′.

It is obvious that instead of arranging only one pair of moulds in the movable table, two or more pairs might be arranged in one and the same table, to operate in combination with a corresponding number of press-boxes. Otherwise the machine may be provided only with one single press-box, two moulds being contained in the table, as before, which are alternately carried under the one single press-box.

The movable table, instead of having a reciprocating motion, might be made revolving, with a number of moulds arranged in a circle, which are carried, one after another, either under the same single press-box or under a pair of press-boxes. Whenever the number of moulds in the circle is even, the followers of every two of them, situated in a suitable distance from each other, may be connected by a rocking-lever or its equivalent, so that one rises when the other descends, and *vice versa*, thereby a self-acting mutual discharge of bricks being attained, in the same manner as shown in the drawing, where the table is reciprocating.

Having thus described my invention, what I claim as new, and desire to secure by Letters Patent, is—

1. The channels F F′, extending in opposite directions from the tapering spout E, and carrying the compressed clay to the reciprocating table H, substantially as and for the purpose set forth.

2. The feeder or pusher K, in combination with the forming-dies F F′ and moulds I I′, substantially as and for the purpose set forth.

3. The rocking-lever M, carrying the followers L L′, and operating in combination with the reciprocating table H, moulds I I′, and press-boxes G G′, substantially as and for the purpose described.

4. The recesses *h* in the press-boxes G G′, to allow the surplus clay to escape, as set forth.

5. The pieces of flannel, or other absorbent material, supplied with oil from cups *m*, in combination with the reciprocating table H, moulds I I′, and followers L L′, constructed and operating substantially as and for the purpose described.

Witnesses:

W. Hauff,

E. F. Kastenhuber,

H. DUEBERG.